United States Patent [19]
Shen et al.

[11] 3,903,300
[45] Sept. 2, 1975

[54] METHOD FOR TREATING PAIN, FEVER AND INFLAMMATION

[75] Inventors: Tsung-Ying Shen, Westfield; Howard Jones, Holmdel, both of N.J.

[73] Assignee: Merck & Co., Inc., Rahway, N.J.

[22] Filed: Feb. 23, 1973

[21] Appl. No.: 335,399

Related U.S. Application Data

[63] Continuation-in-part of Ser. No. 65,319, Aug. 19, 1970, abandoned.

[52] U.S. Cl. ................................................. 424/317
[51] Int. Cl.² ......................................... A61K 31/19
[58] Field of Search ....................... 424/317; 65/319

[56] References Cited
UNITED STATES PATENTS
2,750,422   6/1956   Sanderson........................... 260/617

OTHER PUBLICATIONS
Fiesen et al., Natural Products Related to Phenanthrone, p. 58, 1949.

Primary Examiner—Jerome D. Goldberg
Attorney, Agent, or Firm—Stanley E. Anderson; Mario A. Monaco; Harry E. Westlake, Jr.

[57] ABSTRACT

Phenanthrene carboxylic acid derivatives useful as anti-inflammatory agents.

3 Claims, No Drawings

METHOD FOR TREATING PAIN, FEVER AND INFLAMMATION

CROSS REFERENCES

This application is a continuation-in-part of application Ser. No. 65,319 filed Aug. 19, 1970 now abandoned.

SUMMARY OF THE INVENTION

This invention relates to new chemical compounds. More specifically, this invention relates to new naphthoic acid derivatives having the following general formula:

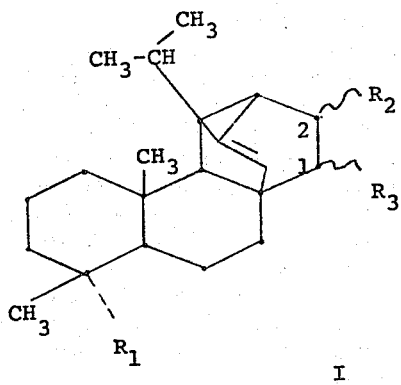

I wherein $R_1$ is hydrogen, methyl, hydroxymethyl, formyl, amino, carbamoyl, methoxycarbonylamino or isopropylcarbonylamino and $R_2$ and $R_3$ each may be hydrogen, carboxy, methyl, cyano or amino or together form part of an anhydride or phenylimide ring. In the more preferred aspect of this invention, $R_2$ and $R_3$ may each be hydrogen, carboxy, methyl, or together form part of an anhydride or phenylimide ring. In the still more preferred aspect of this invention, $R_2$ and $R_3$ are each carboxy. Similarly in the more preferred aspect of this invention, $R_1$ is hydroxymethyl or formyl.

The compounds of the instant invention may be prepared by treating abietic acid to convert the carboxylic acid side chain to the desired alcohol, aldehyde, amide or other substituent and treating the resultant carboxylic acid derivative to introduce the cyano, amino, carboxy or methyl group in the 1 or 2 position.

The compounds of this invention are useful in the treatment of inflammation. It is believed that the antiinflammatory activity of these compounds is due to the inhibition of complement, a group of nine serum proteins which act sequentially to produce cell destruction and to generate inflammation.

This invention also relates to a method of treating pain, fever or inflammation in patients (animal or human) using a compound of Formula I.

The treatment of inflammation in accordance with the method of the present invention is accomplished by topically, orally, rectally or parenterally administering to patients a composition of a compound of Formula I in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, for compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manner.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 50 mg. to 750 mg. per kg. body weight per day, preferably about 250 mg. to 500 mg./kg. body weight per day.

The method of treatment of this invention comprises administering to a patient (animal or human), a compound of Formula I admixed with a non-toxic pharmaceutical carrier such as exemplified above. The compounds of Formula I will be administered in an amount of from 50 mg. to 750 mg./kg. body weight per day, preferably from about 250 mg. to about 500 mg. per kilogram body weight per day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The following examples are presented to further illustrate the invention:

EXAMPLE 1

1-Cyano-1,2,4,4a,4b,5,6,7,8,8a,9,10-dodecahydro-12-isopropyl-4b$\beta$,8$\beta$-dimethyl-3H,3,10a-ethenophenanthrene-8$\alpha$-methanol A. 3,4,4a,4b,5,6,7,8,8a,9-Decahydro-8$\alpha$-hydroxymethyl-4b$\beta$,8$\beta$-dimethyl-2-isopropylphenanthrene Abietic acid (4g.) is dissolved in absolute alcohol (40 ml.) and concentrated sulphuric acid is added (0.5 ml.). The mixture is refluxed for five hours and evaporated to a volume of 10 ml. The reaction mixture is poured into water (200 ml.) and the methyl abietate which is precipitated is filtered off.

Methyl abietate (2 g.) in tetrahydrofuran is reduced with lithium aluminum hydride (0.5 g.) at 0° with stirring. After 1 hour the solution is poured into water and the product is extracted with ethyl acetate (2 × 300 ml.). The ethyl acetate solution is dried over anhydrous magnesium sulphate, filtered and the filtrate is evaporated to dryness to give 3,4,4a,4b,5,6,7,8,8a,9- decahydro-8α-hydroxymethyl-4b,β,8β-dimethyl-2-isopropylphenanthrene.

B. 1-Cyano-1,2,4,4a,4b,5,6,7,8,8a,9,10-dodecahydro-12-isopropyl-4bβ,8β-dimethyl-3H,3,10a-ethenophenanthrene-8α-methanol A mixture of 10 g. (0.03 moles) of 3,4,4a,4b,5,6,7,-8a,9-decahydro-8α-hydroxymethyl-4bβ,8β-dimethyl-2-isopropylphenanthrene, prepared according to the procedure of Example 1 and 20 ml. (0.31 mole) of acrylonitrile is heated at 110° in an oil bath with stirring under nitrogen for 3 hours. The mixture becomes homogeneous after 1 hour and after 3 hours is poured into 200 ml. of water. The water is heated to boiling and decanted leaving a white gum which is dissolved in 100 ml. of benzene. The benzene solution is washed with water, evaporated and dried under vacuum for 3 hours at 100° to give 1-cyano-1,2,4,4a,4b,5,6,7,8,8a,9,10-dodecahydro-12-isopropyl-4bβ,8β-dimethyl-3H,3,10a-ethenophenanthrene-8α-methanol.

EXAMPLE 2

1-Carboxy-1,2,4,4b,5,6,7,8,8a,9,10-dodecahydro-12-isopropyl-2,4bβ,8β-trimethyl-3H,3,10a-etheno-phenanthrene-8α-methanol A. 3,4,4a,4b,5,6,7,8,8a,9-Decahydro-8α-hydroxymethyl-4bβ,8β-dimethyl-2isopropylphenanthrene Abietic acid (4 g.) is dissolved in absolute alcohol (40 ml.) and concentrated sulphuric acid is added (0.5 ml.). The mixture is refluxed for five hours and evaporated to a volume of 10 ml. The reaction mixture is poured into water (200 ml.) and the methyl abietate which is precipitated is filtered off.

Methyl abietate (2g.) in tetrahydrofuran is reduced with lithium aluminum hydride (0.5 g.) at 0° with stirring. After 1 hour the solution is poured into water and the product is extracted with ethyl acetate (2 × 300 ml.). The ethyl acetate solution is dried over anhydrous magnesium sulphate, filtered and the filtrate is evaporated to dryness to give 3,4,4a,4b,5,6,7,8,8a,9-decahydro-8β-hydroxymethyl-4bβ,8β-dimethyl-2-isopropylphenanthrene.

B. 1-Carboxyl-1,2,4,4a,4b,5,6,7,8,8a,9,10-dodecahydro-12-isopropyl-2,4bβ,8β-trimethyl-3H,3,10a-ethenophenanthrene-8α-methanol 3,4,4a,4b,5,6,7,8,8a,9-Decahyro-8a-hydroxymethyl-4b,β,8β-dimethyl-2-isopropylphenanthrene (1300 g., 4.35 moles) is heated at 225° with slow stirring, and 482 g. (6.80 mole) of practical grade crotomic acid is added during 1 hour. Heating at 225° is continued for 4 hours. The product is dissolved in 500 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulfate, and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give 1-carboxy-1,2,4,4a,4b,5,6,7,8,8a,9,10-dodecahydro-12-isopropyl-2,4bβ,8β-trimethyl-3H,3,10a-etheno-phenanthrene-8α-methanol.

EXAMPLE 3

1,2,4,4a,4b,5,6,7,8,8a,9,10-Dodecahydro-12-isopropyl-4bβ,8β-dimethyl-3H,3,10a-etheno-8α-hydroxymethylenephenanthrene-1,2-trans-dicarboxylic acid A. 3,4,4a,4b,5,6,7,8,8a,9-Decahydro-8α-hydroxymethyl-4bβ,8β-dimethyl-2-isopropylphenanthrene Abietic acid (4 g.) is dissolved in absolute alcohol (40 ml.) and concentrated sulphuric acid is added (0.5 ml.). The mixture is refluxed for five hours and evaporated to a volume of 10 ml. The reaction mixture is poured into water (200 ml.) and the methyl abietate which is precipitated is filtered off.

Methyl abietate (2 g.) in tetrahydrofuran is reduced with lithium aluminum hydride (0.5 g.) at 0° with stirring. After one hour the solution is poured into water and the product is extracted with ethyl acetate (2 × 300 ml.). The ethyl acetate solution is dried over anhydrous magnesium sulphate, filtered and the filtrate is evaporated to dryness to give 3,4,4a,4b,5,6,7,8,8a,9-decahydro-8α-hydroxymethyl-4bβ,8β-dimethyl-2-isopropylphenanthrene.

B. 1,2,4,4a,4b,5,6,7,8,8a,9,10-Dodecahydro-12-isopropyl4bβ,8β-dimethyl-3H,3,10a-etheno-8α-hydroxymethylenephenanthrene-1,2-trans-dicarboxylic acid 3,4,4a,4b,5,6,7,8,8a,9-Decahydro-8α-hydroxymethyl-4bβ,8β-dimethyl-2-isopropylphenanthrene (120 g.) is heated under nitrogen to 200° prior to the addition of 124.0 g. (1.07 moles, 60% excess) of fumaric acid. Heating of the reaction mixture is continued at 200°for 2.5 hours with stirring under nitrogen. A portion of the product, 307.1 g., is dissolved in 1l. of benzene-alcohol (85:15). The solution is washed 3 times with water (500 ml. portions) to remove the alcohol and cause the formation of a crystalline hydrate of the adduct acid. The crystalline hydrate is recovered by filtration and dried in vacuum at 110° for 5 hours to yield a hemihydrate. A 10.00 g. sample of the hemihydrate is recrystallized twice from 150 ml. of chloroform-methanol (85:15). The solutions are washed with water, filtered and allowed to stand overnight for crystallization. This procedure yields a crystalline hydrate acid which when dried as above yields the hemihydrate. Drying the hemihydrate at 152° in vacuum for 6 hours yields 1,2,4,4a,4b,-5,6,7,8,8a,9,10-decahydro-12-isopropyl-4bβ,8β-dimethyl-3H,3,10a-etheno-8α-hydroxymethylenephenanthrene-1,2-trans-dicarboxylic acid.

EXAMPLE 4

1,2,4,4a,4b,5,6,7,8,8a,9,10-Dodecahydro-12-isopropyl-4bβ,8β-dimethyl-3H,3,10a-etheno-8α-hydroxymethylenephenanthrene-1,2-dicarboxylic acid anhydride A. 3,4,4a,4b,5,6,7,8,8a,9-Decahydro-8α-hydroxymethyl-4bβ,8β-dimethyl-2-isopropylphenanthrane Abietic acid (4 g.) is dissolved in absolute alcohol (40 ml.) and concentrated sulphuric acid is added (0.5 ml.). The mixture is refluxed for 5 hours and evaporated to a volume of 10 ml. The reaction mixture is poured into water (200 ml.) and the methyl abietate which is precipitated is filtered off.

Methyl abietate (2 g.) in tetrahydrofuran is reduced with lithium aluminum hydride (0.5 g.) at 0° with stirring. After 1 hour the solution is poured into water and the product is extracted with ethyl acetate (2 × 300 ml.). The ethyl acetate solution is dried over anhydrous magnesium sulphate, filtered and the filtrate is evaporated to dryness to give 3,4,4a,4b,5,6,7,8,8a,9-decahydro-8β-hydroxymethyl-4bβ,8β-dimethyl-2-isopropylphenanthrene.

B. 1,2,4,4a,4b,5,6,7,8,8a,9,10-Dodecahydro-12-isopropyl-4bβ,8β-dimethyl-3H,3,10a-etheno-8α-hydroxymethylenephenanthrene-1,2-dicarboxylic acid anhydride A mixture of 0.15 g. 3,4,4a,4b,5,6,7,8,8a,9-decahydro-8α-hydroxymethyl-4bβ,8β-dimethyl-2-isopropylphenanthrene and 0.07 g. of maleic anhydride is heated in an oil-bath at 150° for 2 hours. The product is dissolved in ether, washed neutral with water, dried over sodium sulfate, and evaporated to drynes. The 1,-2,4,4a,4b,5,6,7,8,8a,9,10-dodecahydro-12-isopropyl-4bβ,8β-dimethyl-3H, 3,10a-etheno-8β-hydroxymethylenephenanthrene-1,2-dicarboxylic acid anhydride is crystallized from benzene-isooctane.

EXAMPLE 5

1-Cyano-1,2,4,4a,4b,5,6,7,8,8a,9,10-dodecahydro-12-isopropyl-4bβ,8β-dimethyl-3H,3,10a-ethenophenanthrene-8β-carboxaldehyde A. 8α-Carboxyaldehyde-3,4,4a,4b,5,6,7,8,8a,9-decahydro-4bβ,8β-dimethyl-2-isopropylphenanthrene 3,4,4a,4b,5,6,7,8,8a,9-Decahydro-8α-hydroxymethyl-4bβ,8β-dimethyl-2-isopropylphenanthrene (1.0 g.) is oxidized with chromic oxide (0.5 g.) in glacial acetic acid (20 ml.) at 50° over 3 hours and then evaporated to 5 ml. It is poured into ice-water and the precipitated 8α-carboxyaldehyde-3,4,4a,4b,5,6,7,8,8a,9-decahydro-4bβ,8β-dimethyl-2-isopropylphenanthrene (0.84 g.) is collected and dried.

B. 1-Cyano-1,2,4,4a,4b,5,6,7,8,8a,9,10-dodecahydro-12-isopropyl-4bβ,8β-dimethyl-3H,3,10a-ethenophenanthrene8α-carboxaldehyde A mixture of 10 g. (0.03 mole) of 8α-carboxyaldehyde-3,4,4,a,4b,5,6,7,8,8a,9-decahydro-4bβ,8β-dimethyl-2-isopropylphenanthrene, prepared according to the procedure of Example 2, and 20 ml. (0.31 mole) of acrylonitrile is heated at 110° in an oil bath with stirring under nitrogen for 3 hours. The mixture becomes homogeneous after 1 hour and after 3 hours is poured into 200 ml. of water. The water is heated to boiling and decanted leaving a white gum which is dissolved in 100 ml. of benzene. The benzene solution is washed with water, evaporated and dried under vacuum for 3 hours at 100° to give 1-cyano-1,2,4,4a,4b,5,6,7,8,8a,9,10-dodecahydro-12-isopropyl-4bβ,8β-dimethyl-3H,3,10a-ethenophenanthrene-8α-carboxaldehyde.

EXAMPLE 6

8α-Carboxyaldehyde-1,2,4,4a,4b,5,6,7,8,8a,9,10-dodeca-12-isopropyl-2,4bβ,8β-trimethyl-3H,3,10a-ethenophenanthrene-1-carboxylic acid A. 8α-Carboxyaldehyde-3,4,4a,4b,5,6,7,8,8a,9-decahydro-4bβ,8β-dimethyl-2-isopropylphenanthrene 3,4,4,a,4b,5,6,7,8,8a,9-Decahydro-8α-hydroxymethyl-4bβ,8β-dimethyl-2-isopropylphenanthrene (1.0 g.) is oxidized with chromic oxide (0.5 g.) in glacial acetic acid (20 ml.) at 50° over 3 hours and then evaporated to 5 ml. It is poured into ice-water and precipitated 8α-carboxyaldehyde-3,4,4,a,4b,5,6,7,8,8a,9-decahydro-4bβ,8β-dimethyl-2-isopropylphenanthrene (0.84 g.) is collected and dried.

B. 8α-Carboxaldehyde-1,2,4,4a,4b,5,6,7,°,8a,9,10-dodeca-12-isopropyl-2,4bβ,8β-trimethyl-3H,3,10a-ethenophenanthrene-1-carboxylic acid 8α-Carboxyaldehyde-3,4,4a,4b,5,6,7,8,8a,9-decahydro-4bβ,8β-dimethyl-2isopropylphenanthrene 1.31 g. (0.0044 moles) at 225° with slow stirring and 0.482 g. (0.006 moles) of practical grade crotonic acid is added during 1 hour. Heating at 225° is continued for 4 hours. The product is dissolved in 10 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulfate, and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give 8α-carboxaldehyde-1,2,4,4a,4b,5,6,7,8,8a,9,10-dodeca-12-isopropyl-2,4bβ,8β-trimethyl-3H,3,10a-ethenophenanthrene-1-carboxylic acid.

EXAMPLE 7

1,2,4,4a,4b,5,6,7,8,8a,9,10-Dodecahydro-12-isopropyl-4bβ-threne-1,2-trans-dicarboxylic acid A. 8α-Carboxyaldehyde-3,4,4a,4b,5,6,7,8,8a,9-decahydro-4bβ,8β-dimethyl-2-isopropylphenanthrene 3,4,4a,4b,5,6,7,8,8a,9-Decahydro-8α-hydroxymethyl-4bβ,8β-dimethyl-2-isopropylphenanthrene (1.0 g) is oxidized with chromic oxide (0.5 g.) in glacial acetic acid (20 ml.) at 50° over 3 hours and then evaporated to 5 ml. It is poured into ice-water and the precipitated 8α-carboxyaldehyde-3,4,4,a,4b,5,6,7,8,8a,9-decahydro-4bβ,-8β-dimethyl-2-isopropylphenanthrene (0.84 g.) is collected and dried.

B. 1,2,4,4a,4b,5,6,7,8,8a,9,10-Dodecahydro-12-isopropyl-4bβ,8β-dimethyl-3H,3,10a-etheno-8α-carboxaldehydephenanthrene-1,2-trans-dicarboxylic acid 8α-Carboxyaldehyde-3,4,4a,4b,5,6,7,8,8a,9-decahydro-4bβ,8β-dimethyl-2-isopropylphenanthrene (120g.) is heated under nitrogen to 200° prior to the addition of 124.0 g. (1.07 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct. Drying the adduct at 152° in vacuum for 6 hours yields 1,2,4,4a,4b,5,6,7,8,8a,9,10-dodecahydro-12-isopropyl-4bβ,8β-dimethyl-3H,3,10a-etheno-8α-carboxaldehydephenanthrene-1,2-trans-dicarboxylic acid.

EXAMPLE 8

8α-Carboxaldehyde-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride A. 8α-Carboxaldehyde-3,4,4a,4b,5,6,7,8,8a,9-decahydro-4bβ,8β-dimethyl-2-isopropylphenanthrene 3,4,4a,4b,5,6,7,8,8a,9-Decahydro-8α-hydroxymethyl-4bβ,8β-dimethyl-2-isopropylphenanthrene (1.0 g.) is oxidized with chromic oxide (0.5 g.) in glacial acetic acid (20 ml.) at 50° over 3 hours and then evaporated to 5 ml. It is poured into ice-water and the precipitated 8α-carboxaldehyde-3,4,4a,4b,5,6,7,8,8a,9-decahydro-4bβ,8β-dimethyl-2-isopropylphenanthrene (0.84 g.) is collected and dried.

B. 8α-Carboxaldehyde-1,2,4,4,4b,5,6,7,8,8a,9,10-dodecahydro-12-isopropyl-4bβ,8β-dimethyl-3H,3,10a-ethenophenanthrene-1,2-dicarboxylic acid anhydride A mixture of 0.15 g. of 8α-carboxaldehyde-3,4,4a,4b,5,6,7,8,8a,9-decahydro-4bβ,8β-dimethyl-2-isopropylphenanthrene and 0.07 g. of maleic anhydride is heated in an oil-bath at 150° for 2 hours. The product is dissolved in ether, washed neutral with water, dried over sodium sulfate, and evaporated to dryness. The 8α-carboxaldehyde-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride is crystallized from benzene-isooctane.

EXAMPLE 9

1-Cyano-1,2,4,4a,4b,5,6,7,8,8a,9,10-dodecahydro-12isopropyl-4bβ,8α,8β-trimethyl-3H,3,10a-ethenophenanthrene A. 3,4,4a,4b,5,6,7,8,8a,9-Decahydro-4bβ,8β,8α-trimethyl-2-isopropylphenanthrene 8α-Carboxaldehyde-3,4,4a,4b,5,6,7,8,8a,9-decahydro-4bβ,8β-dimethyl-2-isopropylphenanthrene (1.0 g.) is refluxed in concentrated hydrochloric acid (50 ml.) with amalgamated zinc metal (4 g.) for 8 hours and then filtered cold. The residue is washed with ethyl acetate and combined washings and filtrates separated. The ethyl acetate is dried and evaporated to give 0.8 g. of 3,4,4a,4b,5,6,7,8,8a,9-decahydro-4bβ,8β8a-trimethyl-2-isopropylphenanthrene.

B. 1-Cyano-1,2,4,4a,4b,5,6,7,8,8a,9,10-dodecahydro-12-isopropyl-4bβ,8α,8β-trimethyl-3H,3,10a-ethenophenanthrene A mixture of 10 g. (0.03 mole) of 3,4,4a,4b,5,6,7,8,8a,9-decahydro-4bβ,8β,8a-trimethyl-2isopropylphenanthrene, prepared according to the procedure of Example 3, and 20 ml. (0.31 mole) of acrylonitrile is heated at 110° in an oil bath with stirring under nitrogen for 3 hours. The mixture becomes homogeneous after 1 hour and after 3 hours is poured into 200 ml. of water. The water is heated to boiling and decanted leaving a white gum which is dissolved in 100 ml. of benzene. The benzene solution is washed with water, evaporated and dried under vacuum for 3 hours at 100° to give 1-cyano-1,2,4,4a,4b,5,6,7,8,8a,9,10-dodecahydro-12-isopropyl-4bβ,8α,8β-trimethyl-3H,3,10a-ethenophenanthrene.

EXAMPLE 10

1,2,4,4a,4b,5,6,7,8,8a,9,10-Dodeca-12-isopropyl-2,4bβ,8α,8β-tetramethyl-3H,3,10a-ethenophenanthrene-1-carboxylic acid A. 3,4,4a,4b,5,6,7,8,8a,9-Decahydro-4bβ,8β,8α-trimethyl-2-isopropylphenanthrene 8α-Carboxaldehyde-3,4,4a,4b,5,6,7,8,8a,9-decahydro-4bβ,8βdimethyl- 2-isopropylphenanthrene (1.0 g.) is refluxed in concentrated hydrochloric acid (50 ml.) with amalgamated zinc metal (4 g.) for 8 hours and then filtered cold. The residue is washed with ethyl acetate and combined washings and filtrates separated. The ethyl acetate is dried and evaporated to give 0.8 g. of 3,4,4a,4b,5,6,7,8,8a,9-decahydro-4bβ,8β,8α-trimethyl-2-isopropylphenanthrene.

B. 1,2,4,4a,4b,5,6,7,8,8a,9,10-Dodeca-12-isopropyl-2,4bβ,8α,8β-tetramethyl-3H,3,10a-ethenophenanthrene-1-carboxylic acid 3,4,4a,4b,5,6,7,8,8a,9-Decahydro-4bβ,8β,8α-trimethyl-2-isopropylphenanthrene 3.4 g. (0.014 moles) is heated at 225° with slow stirring, and 1.6 g. (0.021 mole) of practical grade crotonic acid is added during 1 hour. Heating at 225° is continued for 4 hours. The product is dissolved in 20 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulphate and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give 1,2,4,4a,4b,5,6,7,8,8a,9,10-dodeca-12-isopropyl-2,4bβ, 8α,8β-tetramethyl-3H,3,10a-ethenophenanthrene-1-carboxylic acid.

EXAMPLE 11

1,2,4,4a,4b,5,6,7,8,8a,9,10-Dodecahydro-12-isopropyl-4bβ,8α,8β-trimethyl-3H,3,10a-ethenophenanthrene-1,2-trans-dicarboxylic acid A. 3,4,4a,4b,5,6,7,8,8a,9-Decahydro-4bβ,8β,8α-trimethyl-2-isopropylphenanthrene 8α-Carboxaldehyde-3,4,4a,4b,5,6,7,8,8a,9-decahydro-4bβ,8β-dimethyl-2-isopropylphenanthrene (1.0 g.) is refluxed in concentrated hydrochloric acid (50 ml.) with amalgamated zinc metal (4 g.) for 8 hours and then filtered cold. The residue is washed with ethyl acetate and combined washings and filtrates separated. The ethyl acetate is dried and evaporated to give 0.8 g. of 3,4,4a,4b,5,6,7,8,8a,9-decahydro-4bβ,8β,8α-trimethyl-2-isopropylphenanthrene.

B. 1,2,4,4a,4b,5,6,7,8,8a,9,10-Dodecahydro-12-isopropyl4bβ,8α,8β-trimethyl-3H,3,10a-ethenophenanthrene-1,2-trans-dicarboxylic acid 3,4,4a,4b,5,6,7,8,8a,9-Decahydro-4bβ,8β8α-trimethyl-2-isopropylphenanthrene (120 g.) is heated under nitrogen to 200° prior to the addition of 124.0 g. (1.07 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct. The crystalline product is recovered by filtration and dried in vacuum at 110° for 5 hours to yield 1,2,4,4a,4b,5,6,7,8,8a,9,10-dodecahydro-12-isopropyl-4bβ,8α,8β-trimethyl-3H,3,10a-ethenophenanthrene-1,2-trans-dicarboxylic acid.

EXAMPLE 12

1,2,4,4a,4b,5,6,7,8,8a,9,10-Dodecahydro-12-isopropyl-4bβ,8α,8β-trimethyl-3H,3,10a-ethenophenanthrene-1,2-dicarboxylic acid anhydride A.   3,4,4a,4b,5,6,7,8,8a,9-Decahydro-4bβ,8β,8α-trimethyl-2-isopropylphenanthrene 8α-Carboxyaldehyde-3,4,4a,4b,5,6,7,8,8a,9-decahydro-4bβ,8β-dimethyl-2-isopropylphenanthrene (1.0 g.) is refluxed in concentrated hydrochloric acid (50 ml.) with amalgamated zinc metal (4 g.) for 8 hours and then filtered cold. The residue is washed with ethyl acetate and combined washings and filtrates separated. The ethyl acetate is dried and evaporated to give 0.8 g. of 3,4,4a,4b,5,6,7,8,8a,9-decahydro-4bβ,8β,8α-trimethyl-2-isopropylphenanthrene.

B.   1,2,4,4a,4b,5,6,7,8,8a,9,10-Dodecahydro-12-isopropyl-4bβ,8α,8β-trimethyl-3H,3,10a-ethenophenanthrene-1,2-dicarboxylic acid anhydride A mixture of 0.15 g. 3,4,4a,4b,5,6,7,8,8a,9-decahydro-4bβ,8β,8α-trimethyl-2-isopropylphenanthrene and 0.07 g. of maleic anhydride is heated in an oil-bath at 150° for 2 hours. The product is dissolved in ether, washed neutral with water, dried over sodium sulfate, and evaporated to dryness. The 1,2,4,4a,4b,5,6,7,8,8a,9,10-dodecahydro-12-isopropyl-4bβ,8α,8β-trimethyl-3H,3,10a-ethenophenanthrene-1,2-dicarboxylic acid anhydride is crystallized from benzene-isooctane.

EXAMPLE 13

3,4,4a,4b,5,6,7,8,8a,9-Decahydro-4bβ,8β-dimethyl-2-isopropylphenanthrene

Abietic acid (20 g.) is dry distilled under 10 to 20 mm. pressure and carbon dioxide is given off. One fraction is isolated and 3,4,4a,4b,5,6,7,8,8a,9-decahydro4bβ,8β-dimethyl-2-isopropylphenanthrene is obtained.

EXAMPLE 14

8α-Carboxamido-1,2,4,4a,4b,5,6,7,8,8a,9,10-dodeca-12-isopropyl-2,4bβ,8β-trimethyl-3H,3,10a-ethenophenanthrene-1-carboxylic acid A.   8α-Carboxamide-3,4,4a,4b,5,6,7,8,8a,9-decahydro-4bβ,8β-dimethyl-2-isopropylphenanthrene Abietic acid (2 g.) is dissolved in methylene chloride (10 ml.) and refluxed with distilled thionyl chloride (10 ml.) containing one drop of dimethylformamide for 5 hours. The mixture is evaporated to dryness and the acyl chloride recrystallized from benzene.

The acyl chloride is refluxed in concentrated ammonia solution for 2 hours and filtered. In this way 8α-carboxamide-3,4,4a,4b,5,6,7,8,8a,9-decahydro-4bβ,8β-dimethyl-2-isopropylphenanthrene is obtained.

B.   8α-Carboxamido-1,2,4,4a,4b,5,6,7,8,8a,9,10-dodeca-12-isopropyl-2,4bβ,8β-trimethyl-3H,3,10a-ethenophenanthrene-1-carboxylic acid 8α-Carboxamido-3,4,4a,4b,5,6,7,8,8a,9-decahydro4bβ,8β-dimethyl-2-isopropylphenanthrene 27 g. is heated at 180° with slow stirring and 0.8 g. practical grade crotomic acid is added during 1 hour. Heating at 160° is continued for 4 hours. The product is dissolved in 50 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulfate, and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give 8α-carboxamido-1,2,4,4a,4b,5,6,7,8,8a,9,10-dodeca-12-isopropyl-2,4bβ,8β-trimethyl-3H,3,10a-ethenophenanthrene-1-carboxylic acid.

EXAMPLE 15

8α-Carboxamido-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid A.   8α-Carboxamide-3,4,4a,4b,5,6,7,8,8a,9-decahydro-4bβ,8β-dimethyl-2-isopropylphenanthrene Abietic acid (2 g.) is dissolved in methylene chloride (10 ml.) and refluxed with distilled thionyl chloride (10 ml.) containing one drop of dimethylformamide for 5 hours. The mixture is evaporated to dryness and the acyl chloride recrystallized from benzene.

The acyl chloride is refluxed in concentrated ammonia solution for 2 hours and filtered. In this way 8α-carboxamide-3,4,4a,4b,5,6,7,8,8a,9-decahydro-4bβ,8β-dimethyl-2-isopropylphenanthrene is obtained.

B.   8α-Carboxamido-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid 8α-Carboxamido-3,4,4a,4b,5,6,7,8,8a,9,-decahydro-4bβ,8β-dimethyl-2-isopropylphenanthrene (12.0 g.) is heated under nitrogen to 200° prior to the addition of 12.4 g. (0.11 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct. The crystalline product is recovered by filtration and dried in vacuum at 110° for 5 hours to yield 8α-carboxamido-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid.

EXAMPLE 16

8α-Carboxamido-1,2,4,4a,4b,5,6,7,8,8a,9,10-dodecahydro-12-isopropyl-4bβ,8β-dimethyl-3H,3,10a-ethenophenanthrene1,2-dicarboxylic acid anhydride A.   8α-Carboxamide-3,4,4a,4b,5,6,7,8,8a,9-decahydro-4bβ,8β-dimethyl-2-isopropylphenanthrene Abietic acid (2 g.) is dissolved in methylene chloride (10 ml.) and refluxed with distilled thionyl chloride (10 ml.) containing one drop of dimethylformamide for 5 hours. The mixture is evaporated to dryness and the acyl chloride recrystallized from benzene.

The acyl chloride is refluxed in concentrated ammonia solution for 2 hours and filtered. In this way 8α-carboxamide-3,4,4a,4b,5,6,7,8,8a,9-decahydro-4bβ,8β-dimethyl-2-isopropylphenanthrene is obtained.

B.   8α-Carboxamido-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride A mixture of 0.15 g. of 8α-carboxamido-3,4,4a,4b,5,6,7,8,8a,9-decahydro-4bβ,8β-dimethyl-2-isopropylphenanthrene and 0.07 g. of maleic anhydride is heated in an oil-bath at 150° for 2 hours. The product is dissolved in ether, washed neutral with water, dried over sodium sulfate, and evaporated to dryness. The 8α-carboxamido-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride is crystallized from benzene-isooctane.

EXAMPLE 17

Methyl-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid-8-α-carbamate A. Methyl-3,4,4a,4b,5,6,7,8,8a,9-decahydro-4bβ,8β-dimethyl-2-isopropylphenanthrene-8α-urethane Abietic acid (2.0 g., 0.005 mole) is refluxed in distilled thionyl chloride (25 ml.) containing one drop of dimethylformamide for 5 hours, evaporated to dryness and the acyl chloride recrystallized from benzene.

A solution of sodium azide (0.33 g., 0.005 mole) in water (0.2 ml.) is added slowly with stirring at 0° to a solution of the acyl chloride (1.05 g., 0.002 mole) in acetone:dioxane (1:1 40 ml.) over 30 minutes. The solution is allowed to warm to 40° over 2 hours, filtered and dried over magnesium sulphate. The azide was crystallized by evaporation of the solvent at 20°.

A solution of the azide (1.23 g., 0.003 mole) in dry acetone (10 ml.) is dropped into boiling toluene over 10 minutes and the resulting solution evaporated to dryness. The solid isocyanate is recrystallized from benzene.

A portion of the isocyanate prepared above (0.3 g., 0.0007 mole) is refluxed in methanol for 20 minutes to give the crystalline methyl-3,4,4a,4b,5,6,7,8,8a,9-decahydro-4bβ,8β-dimethyl-2-isopropylphenanthrene-8α-urethane.

B. Methyl-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid-8-α-carbamate Methyl-3,4,4a,4b,5,6,7,8,8a,9-decahydro-4bβ,8βdimethyl-2-isopropylphenanthrene-8α-urethane (12.0 g.) is heated under nitrogen to 200° prior to the addition of 12.4 g. (0.11 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct. The crystalline product is recovered by filtration and dried in vacuum at 110° for 5 hours to yield methyl-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid-8-α-carbamate.

EXAMPLE 18

Methyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate and Isopropylmethyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate Maleopimaric acid (2.0 g., 0.005 mole) is refluxed in distilled thionyl chloride (25 ml.) containing one drop of dimethylformamide for 5 hours, evaporated to dryness and the acyl chloride recrystallized from benzene, m.p. 164°–165°.

A solution of sodium azide (0.33 g., 0.005 mole) in water (0.2 ml.) is added slowly with stirring at 0° to a solution of the acyl chloride (1.05 g., 0.002 mole) in acetone:dioxane (1:1 40 ml.) over 30 minutes. The solution is allowed to warm to 40° over 2 hours, filtered and dried over magnesium sulphate. The crystals of azide resulting from evaporation of the solvent at 20° have m.p. 114–115° (dec.).

A solution of the azide (1.23 g., 0.003 mole) in dry acetone (10 ml.) is dropped into boiling toluene over 10 minutes and the resulting solution evaporated to dryness. The solid isocyanate is recrystallized from benzene and has m.p. 120°–121° (dec.).

A portion of the isocyanate prepared above (0.3 g., 0.0007 mole) is refluxed in isopropanol for 20 minutes to give the crystalline methyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate, m.p. 155°–157° (dec.).

Another portion of the isocyanate prepared above (0.3 g., 0.0008 mole) is refluxed for 10 minutes in a constant boiling mixture of methanol in toluene (about 3%) and the crystalline isopropylmethyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate has m.p. 162°–164° (dec.).

EXAMPLE 19

Methyl-1-carboxy-1,2,4,4a,4b,5,6,7,8,8a,9,10-dodecahydro-12-isopropyl-2,4bβ,8β-trimethyl-3H,3,10a-ethenophenanthrene-8α-carboxylate A. Methyl-3,4,4a,4b,5,6,7,8,8a,9,-decahydro-4bβ,8β-dimethyl-2-isopropylphenanthrene-8α-carboxylate Abietic acid (4 g.) is dissolved in methanol alcohol (40 ml.) and concentrated sulphuric acid is added (0.5 ml.). The mixture is refluxed for five hours and evaporated to a volume of 10 ml. The reaction mixture is poured into water (200 ml.) and the methyl-3,4,4a,4b,5,6,7,8,8a,9-decahydro-4bβ,8β-dimethyl-2-isopropylphenanthrene-8α-carboxylate filtered off.

B. Methyl-1-carboxy-1,2,4,4a,4b,5,6,7,8,8a,9,10-dodecahydro-12-isopropyl-2,4bβ,8β-trimethyl-3H,3,10a-ethenophenanthrene-8α-carboxylate Methyl-3,4,4a,4b,5,6,7,8,8a,9-decahydro-4bβ,8β-dimethyl-2-isopropylphenanthrene-8α-carboxylate 6.0 g. (0.02 moles) is heated at 225° with slow stirring, and 2.58 g. (0.03 moles) of practical grade crotonic acid is added during 1 hour. Heating at 225° is continued for 4 hours. The product is dissolved in 500 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulfate, and evaporated. The residue is dried at 100° (0.5 mm.) for 3 hours and refluxed in carbon tetrachloride. The carbon tetrachloride adduct which forms upon cooling is dried at 100° (0.5 mm.) for 3 hours to give crude product which is recrystallized from benzene to give methyl-1-carboxy-1,2,4,4a,4b,5,6,7,8,8a,9,10-dodecahydro-12-isopropyl-2,4b$\beta$,8$\beta$-trimethyl-3H,3,10a-ethenophenanthrene-8$\alpha$carboxylate.

EXAMPLE 20

8$\alpha$-Carboxymethyl-1,2,4,4a,4b,5,6,7,8,8a,9,10-dodecahydro-12-isopropyl-4b$\beta$,8$\beta$-dimethyl-3H,3,10a-ethenophenanthrene-1,2-trans-dicarboxylic acid A. Methyl-3,4,4a,4b,5,6,7,8,8a,9-decahydro-4b$\beta$,8$\beta$-dimethyl-2-isopropylphenanthrene-8$\alpha$-carboxylate Abietic acid (4 g.) is dissolved in methanol alcohol (40 ml.) and concentrated sulphuric acid is added (0.5 ml.). The mixture is refluxed for 5 hours and evaporated to a volume of 10 ml. The reaction mixture is poured into water (200 ml.) and the methyl-2,4,4a,4b,5,6,7,8,8a,9-decahydro-4b$\beta$,8$\beta$-dimethyl-2-isopropylphenanthrene-8$\alpha$-carboxylate filtered off.

B. 8$\alpha$-Carboxymethyl-1,2,4,4a,4b,5,6,7,8,8a,9,10-dodecahydro-12-isopropyl-4b$\beta$,8$\beta$-dimethyl-3H,3,10a-ethenophenanthrene-1,2-trans-dicarboxylic acid Methyl-3,4,4a,4b,5,6,7,8,8a,9-decahydro-4b$\beta$,8$\beta$-dimethyl-2-isopropylphenanthrene-8$\alpha$-carboxylate 3.6 g. (0.032 moles) is heated under nitrogen to 200° prior to the addition of 5.15 g. (0.053 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of the adduct. The crystalline hydrate is recovered by filtration and dried in vacuum at 110° for 5 hours to yield a hemihydrate. The 10.00 g. sample of the hemihydrate is recrystallized twice from 150 ml. of chloroform-methanol (85:15). The solutions are washed with water, filtered and allowed to stand overnight for crystallization. This procedure yields a crystalline hydrate acid which when dried as above yields the hemihydrate. Drying the hemihydrate at 152° in vacuum for 6 hours yields 8$\alpha$-carboxymethyl-1,2,4,4a,4b,5,6,7,8,8a,9,10-dodecahydro-12-isopropyl-4b$\beta$,8$\beta$-dimethyl-3H,3,10a-ethenophenanthrene-1,2-trans-dicarboxylic acid.

EXAMPLE 21

8$\alpha$-Carboxymethyl-1,2,4,4a,4b,5,6,7,8,8a,9,10-dodecahydro-12-isopropyl-4b$\beta$,8$\beta$-dimethyl-3H,3,10a-ethenophenanthrene-1,2-dicarboxylic acid anhydride A. Methyl-3,4,4a,4b,5,6,7,8,8a,9-decahydro-4b$\beta$,8$\beta$-dimethyl-2-isopropylphenanthrene-8$\alpha$-carboxylate Abietic acid (4 g.) is dissolved in methanol alcohol (40 ml.) and concentrated sulphuric acid is added (0.5 ml.). The mixture is refluxed for 5 hours and evaporated to a volume of 10 ml. The reaction mixture is poured into water (200 ml.) and the methyl-3,4,4a,4b,5,6,7,8,8a,9-decahydro-4b$\beta$,8$\beta$-dimethyl-2-isopropylphenanthrene-8$\alpha$-carboxylate filtered off.

B. 8$\alpha$-Carboxymethyl-1,2,4,4a,4b,5,6,7,8,8a,9,10-dodecahydro-12-isopropoyl-4b,8$\beta$-dimethyl-3H,3,10a-ethenophenanthrene-1,2-dicarboxylic acid anhydride A mixture of 0.15 g. of methyl-3,4,4a,4b,5,6,7,8,8a,9-decahydro-4b$\beta$,8$\beta$-dimethyl-2-isopropylphenanthrene-8$\alpha$-carboxylate and 0.07 g. of maleic anhydride is heated in an oil-bath at 150° for 2 hours. The product is dissolved in ether, washed neutral with water, dried over sodium sulfate, and evaporated to dryness. The 8$\alpha$-carboxymethyl-1,2,4,4a,4b,5,6,7,8,8a,9,10-dodecahydro-12-isopropyl-4b$\beta$,8$\beta$-dimethyl-3H,3,10a-ethenophenanthrene-1,2-dicarboxylic acid anhydride is crystallized from benzene-isooctane.

EXAMPLE 22

8$\alpha$-Amino-1,2,4,4a,4b,5,6,7,8,8a,9,10-dodecahydro-12-isopropyl-2,4b$\beta$,8$\beta$-trimethyl-3H,3,10a-ethenophenanthrene-1-carboxylic acid A. 3,4,4a,4b,5,6,7,8,8a,9-Decahydro-4b$\beta$,8$\beta$-dimethyl-2-isopropylphenanthrene-8$\alpha$-ammonium chloride 0.9 G. of methyl-3,4,4a,4b,5,6,7,8,8a,9-decahydro-4b$\beta$,8$\beta$-dimethyl-2-isopropylphenanthrene-8$\alpha$-urethane above is refluxed in 20 ml. of 2.5N hydrochloric acid solution and then after 30 minutes evaporated to dryness. The title compound is collected. The free base can be isolated by dissolving 1 g. of the amine hydrochloride in 20 ml. methanol containing 0.5 g. sodium methoxide, adding water and filtering.

B. 8$\alpha$-Amino-1,2,4,4a,4b,5,6,7,8,8a,9,10-dodecahydro-12-isopropyl-2,4b$\beta$,8$\beta$-trimethyl-3H,3,10a-ethenophenanthrene-1-carboxylic acid 3,4,4a,4b,5,6,7,8,8a,9-Decahydro-4b$\beta$,8$\beta$-dimethyl2-isopropylphenanthrene-8$\alpha$-ammonium chloride 6.0 g. (0.023 moles) is heated at 225° with slow stirring, and 2.58 g. (0.03 moles) of practical grade crotonic acid is added during 1 hour. Heating at 225° is continued for 4 hours. The product is dissolved in 500 ml. of ether, from which the adduct acids are extracted with 5% sodium bicarbonate. The sodium bicarbonate solution is acidified to pH 3 with dilute hydrochloric acid and extracted with ether. The ether solution is washed with water, dried over sodium sulfate, and evaporated. The residue is dried at 100° (0.5 mm.) for 3hours and refluxed in carbon tetrachloride. The carbon tetrachloride adduct which forms upon cooling is dried at 100° (0.5 mm.) for 3 hours to give crude product which is recrystallized from benzene to give 8$\alpha$-amino-1,2,4,4a,4b,5,6,7,8,8a,9,10-dodecahydro-12-isopropyl-2,4b$\beta$,8$\beta$-trimethyl-3H,3,10a-ethenophenanthrene-1-carboxylic acid.

EXAMPLE 23

8$\alpha$-Amino-1,2,4,4a,4b,5,6,7,8,8a,9,10-dodecahydro-12-isopropyl-4b$\beta$,8$\beta$-dimethyl-3H,3,10a-ethenophenanthrene-1,2-trans-dicarboxylic acid A. 3,4,4a,4b,5,6,7,8,8a,9-Decahydro-4b$\beta$,8$\beta$-dimethyl-2-isopropylphenanthrene-8$\alpha$-ammonium chloride 0.9 G. of methyl-3,4,4a,4b,5,6,7,8,8a,9-decahydro-4b$\beta$,8$\beta$-dimethyl-2-isopropylphenanthrene-8$\alpha$-urethane above is refluxed in 20 ml. 2.5N hydrochloric acid solution and then after 30 minutes evaporated to dryness. The title compound is collected. The free base can be isolated by dissolving 1 g. of the amine hydrochloric in 20 ml. methanol containing 0.5 g. sodium methoxide, adding water and filtering.

B. 8α-Amino-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid 3,4,4a,4b,5,6,7,8,8a,9-Decahydro-4bβ,8β-dimethyl-2-isopropylphenanthrene-8α-ammonium chloride 3.6 g. (0.032 moles) in heated under nitrogen to 200° prior to the addition of 6.15 g. (0.053 moles, 60% excess) of fumaric acid. Heating of the reaction mixture is continued at 200° for 2.5 hours with stirring under nitrogen. A portion of the product, 307.1 g., is dissolved in 1 l. of benzene-alcohol (85:15). The solution is washed 3 times with water (500 ml. portions) to remove the alcohol and cause the formation of a crystalline hydrate of 8α-amino-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid which is filtered and dried at 60° under vacuum.

EXAMPLE 24

8α-Amino-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride A. 3,4,4a,4b,5,6,7,8,8a,9-Decahydro-4bβ,8β-dimethyl-2-isopropylphenanthrene-8α-ammonium chloride 0.9 G. of methyl-3,4,4a,4b,5,6,7,8,8a,9-decahydro-4bβ,8βdimethyl-2-isopropylphenanthrene-8α-urethane above is refluxed in 20 ml. 2.5N hydrochloric acid solution and then after 30 minutes evaporated to dryness. The title compound is collected. The free base can be isolated by dissolving 1 g. of the amine hydrochloride in 20 ml. methanol containing 0.5 g. sodium methoxide, adding water and filtering.

B. 8α-Amino-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride A mixture of 0.45 g. of 3,4,4a,4b,5,6,7,8,8a,9-decahydro-4bβ,8β-dimethyl-2-isopropylphenanthrene-8α-ammonium chloride and 0.21 g. of maleic anhydride is heated in an oil-bath at 150° for 2 hours. The product is dissolved in ether, washed neutral with water, dried over sodium sulfate, and evaporated to dryness. The 8α-amino-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride is crystallized from benzene-isooctane.

EXAMPLE 25

The anhydrides (1.0 g.) are heated at 140° for 3 days with excess aniline. The mixtures are cooled and the crystalline materials washed with chloroform. In this way the following phenylimides are made from the listed anhydride starting materials.

| Anhydride | Phenylimide |
| --- | --- |
| 1,2,4,4a,4b,5,6,7,8,8a,9,10-dodecahydro-12-isopropyl-4bβ,8β-dimethyl-3H,3,10a-etheno-8α-hydroxymethylenephenanthrene-1,2-dicarboxylic acid anhydride | 1,2,4,4a,4b,5,6,7,8,8a,9,10-dodecahydro-12-isopropyl-4bβ,8β-dimethyl-3H,3,10a-etheno-8α-hydroxymethylenephenanthrene-1,2-dicarboxylic acid phenylimide |
| 8α-carboxaldehyde-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride | 8α-carboxaldehyde-1,2,4,4a,4b,5,6,7,8,8a,9,10-dodecahydro-12-isopropyl-4bβ,8β-dimethyl-3H,3,10a-ethenophenanthrene-1,2-dicarboxylic acid phenylimide |
| 8α-carboxamido-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride | 8α-carboxamido-1,2,4,4a,4b,5,6,7,8,8a,9,10-dodecahydro-12-isopropyl-4bβ,8β-dimethyl-3H,3,10a-ethenophenanthrene-1,2-dicarboxylic acid phenylimide |
| 8α-carboxymethyl-1,2,4,4a,4b,5,6,7,8,8a,9,10-dodecahydro-12-isopropyl-4bβ,8β-dimethyl-3H,3,10a-ethenophenanthrene-1,2-carboxylic acid anhydride | 8α-carboxymethyl-1,2,4,4a,4b,5,6,7,8,8a,9,10-dodecahydro-12-isopropyl-4bβ,8β-dimethyl-3H,3,10a-ethenoboxylic acid phenylimide |
| 8α-amino-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride | 8α-amino-1,2,4,4a,4b,5,6,7,8,8a,9,10-dodecahydro-12-isopropyl-4bβ,8β-dimethyl-3H,3,10a-ethenophenanthrene-1,2-dicarboxylic acid phenylimide |

EXAMPLE 26

A. 1-Carboxy-1,2,4,4a,4b,5,6,7,8,8a,9,10-dodecahydro-12-isopropyl-2,4bβ,8β-trimethyl-3H,3,10a-ethanophenanthrene-8α-methanol A solution of 0.002 moles of 1-carboxy-1,2,4,4a,4b,5,6,7,8,8a,9,10-dodecahydro-12-isopropyl-2,4bβ,8β-trimethyl-3H,3,10a-ethenophenanthrene-8α-methanol in 15 ml. of liquid glacial acetic acid is hydrogenated at atmospheric pressure at room temperature over 0.71 g. of 5% palladium carbon catalyst. After 2.25 hours, 0.04 moles of hydrogen per mole of adduct is absorbed. The catalyst is removed by filtration and the hydrogenated product evaporated to a viscous liquid under vacuum at 60°. The product is crystallized from ethyl acetate.

B. The following compounds were reduced in the same way to produce the corresponding dihydro compound.

| Starting Material | Product |
| --- | --- |
| 1,2,4,4a,4b,5,6,7,8,8a,9,10-dodecahydro-12-isopropyl-4bβ,8β-dimethyl-3H,3,10a-etheno-8α-hydroxymethylenephenanthrene-1,2-trans-dicarboxylic acid | 1,2,4,4a,4b,5,6,7,8,8a,9,10-dodecahydro-12-isopropyl-4bβ,8β-dimethyl-3H,3,10a-ethano-8α-hydroxymethylenephenanthrene-1,2-trans-dicarboxylic acid |
| 1,2,4,4a,4b,5,6,7,8,8a,9,10-dodecahydro-12-isopropyl-4bβ,8β-dimethyl-3H,3,10a-etheno-8α-hydroxymethylenephenanthrene-1,2-dicarboxylic acid anhydride | 1,2,4,4a,4b,5,6,7,8,8a,9,10-dodecahydro-12-isopropyl-4bβ,8β-dimethyl-3H,3,10a-ethano-8α-hydroxymethylenephenanthrene-1,2-dicarboxylic acid anhydride |
| 1,2,4,4a,4b,5,6,7,8,8a,9,10-dodecahydro-12-isopropyl-2,4bβ,8α,8β-tetramethyl-3H,3,10a-ethenophenanthrene-1-carboxylic acid | 1,2,4,4a,4b,5,6,7,8,8a,9,10-dodecahydro-12-isopropyl-2,4bβ,8α,8β-tetramethyl-3H,3,10a-ethanophenanthrene-1-carboxylic acid |
| 1,2,4,4a,4b,5,6,7,8,8a,9,10-dodecahydro-12-isopropyl-4bβ,8α,8β-trimethyl-3H,3,10a-ethenophenanthrene-1,2-dicarboxylic acid anhydride | 1,2,4,4a,4b,5,6,7,8,8a,9,10-dodecahydro-12-isopropyl-4bβ,8α,8β-trimethyl-3H,3,10a-ethanophenanthrene-1,2-dicarboxylic acid anhydride |
| 8α-carboxamido-1,2,4,4a,4b,5,6,7,8,8a,9,10-dodecahydro-12-isopropyl-2,4bβ,8β-trimethyl-3H,3,10a-ethenophenanthrene-1-carboxylic acid | 8α-carboxamido-1,2,4,4a,4b,5,6,7,8,8a,9,10-dodecahydro-12-isopropyl-2,4bβ,8β-trimethyl-3H,3,10a-ethanophenanthrene-1-carboxylic acid |
| 8α-carboxamido-1,2,4,4a,4b,5,6,7,8,8a,9,10-dodecahydro-12-isopropyl- | 8α-carboxamido-1,2,4,4a,4b,5,6,7,8,8a,9,10-dodecahydro-12-isopropyl-4bβ,8β- |

| Starting Material | Product |
|---|---|
| 4bβ,8β-dimethyl-3H,3,10a-ethenophenanthrene-1,2-trans-dicarboxylic acid 8α-carboxamido-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride | dimethyl-3H,3,10a-ethanophenanthrene-1,2-trans-dicarboxylic acid 8α-carboxamido-1,2,4,4a,4b,5,6,7,8,8a,9,10-dodecahydro-12-isopropyl-4bβ,8β-dimethyl-3H,3,10a-ethanophenanthrene-1,2-dicarboxylic acid anhydride |
| methyl-1,2,4,4a,4b,5,6,7,8a,9,10-dodecahydro-12-isopropyl-4bβ,8β-dimethyl-3H,3,10a-ethenophenanthrene-1,2-trans-dicarboxylic acid-8-α-carbamate | methyl-1,2,4,4a,4b,5,6,7,8,8a,9,10-dodecahydro-12-isopropyl-4bβ,8β-dimethyl-3H,3,10a-ethanophenanthrene-1,2-trans-dicarboxylic acid-8-α-carbamate |
| methyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate | methyl-1,2,4,4a,4b,5,6,7,8,8a,9,10-dodecahydro-12-isopropyl-4bβ,8β-dimetnyl-3H,3,10a-ethanophenanthrene-1,2-dicarboxylic acid anhydride-8α-carbamate |
| isopropylmethyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride-8α-carbamate | isopropylmethyl-1,2,4,4a,4b,5,6,7,8,8a,9,10-dodecahydro-12-isopropyl-4bβ,8β-dimethyl-3H,3,10a-ethanophenanthrene-1,2-dicarboxylic acid anhydride-8α-carbamate |
| methyl-1-carboxy-1,2,4,4a,4b,5,6,7,8,8a,9,10-dodecahydro-12-isopropyl-2,4bβ,8β-trimethyl-3H,3,10a-ethenophenanthrene-8α-carboxylate | methyl-1-carboxy-1,2,4,4a,4b,5,6,7,8,8a,9,10-dodecahydro-12-isopropyl-2,4bβ,8β-trimethyl-3H,3,10a-ethanophenanthrene-8α-carboxylate |
| 8α-carboxymethyl-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid | 8α-carboxymethyl-1,2,4,4a,4b,5,6,7,8,8a,9,10-dodecahydro-12-isopropyl-4bβ,8β-dimethyl-3H,3,10a-ethanophenanthrene-1,2-trans-dicarboxylic acid |
| 8α-carboxymethyl-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride | 8α-carboxymethyl-1,2,4,4a,4b,5,6,7,8,8a,9,10-dodecahydro-12-isopropyl-4bβ,8β-dimethyl-3H,3,10a-ethanophenanthrene-1,2-dicarboxylic acid anhydride |
| 8α-amino-1,2,4,4a,4b,5,6,7,8,8a,9,10-dodecahydro-12-isopropyl-2,4bβ,8β-trimethyl-3H,3,10a-ethenophenanthrene-1-carboxylic acid | 8α-amino-1,2,4,4a,4b,5,6,7,8,8a,9,10-dodecahydro-12-isopropyl-2,4bβ,8β-trimethyl-3H,3,10a-ethanophenanthrene-1-carboxylic acid |
| 8α-amino-1,2,4,4a,4b,5,6,7,8,8a,9,10-dodecahydro-12-isopropyl-4bβ,8β-dimethyl-3H,3,10a-ethenophenanthrene-1,2-trans-dicarboxylic acid | 8α-amino-1,2,4,4a,4b,5,6,7,8,8a,9,10-dodecahydro-12-isopropyl-4bβ,8β-dimethyl-3H,3,10a-ethanophenanthrene-1,2-trans-dicarboxylic acid |
| 8α-amino-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride | 8α-amino-1,2,4,4a,4b,5,6,7,8,8a,9,10-dodecahydro-12-isopropyl-4bβ,8β-dimethyl-3H,3,10a-ethanophenanthrene-1,2-dicarboxylic acid anhydride |
| 1,2,4,4a,4b,5,6,7,8,8a,9,10-dodecahydro-12-isopropyl-4bβ,8β-dimethyl-3H,3,10a-etheno-8α-hydroxymethylenephenanthrene-1,2-dicarboxylic acid anhydride | 1,2,4,4a,4b,5,6,7,8,8a,9,10-dodecahydro-12-isopropyl-4bβ,8β-dimethyl-3H,3,10a-ethano-8α-hydroxymethylenephenanthrene-1,2-dicarboxylic acid phenylimide |
| 1,2,4,4a,4b,5,6,7,8,8a,9,10-dodecahydro-12-isopropyl-4bβ,8α,8β-trimethyl-3H,3,10a-ethenophenanthrene-1,2-dicarboxylic acid anhydride | 1,2,4,4a,4b,5,6,7,8,8a,9,10-dodecahydro-12-isopropyl-4bβ,8α,8β-trimethyl-3H,3,10a-ethanophenanthrene-1,2-dicarboxylic acid phenylimide |
| 8α-carboxamido-1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride | 8α-carboxamido-1,2,4,4a,4b,5,6,7,8,8a,9,10-dodecahydro-12-isopropyl-4bβ,8β-dimethyl-3H,3,10a-ethanophenanthrene-1,2-dicarboxylic acid phenylimide |
| 8α-carboxymethyl-1,2,4,4a,4b,5,6,7,8,8a,9,10-dodecahydro-12-isopropyl-4bβ,8β-dimethyl-3H,3,10a-ethenophenanthrene-1,2-carboxylic acid anhydride | 8α-carboxymethyl-1,2,4,4a,4b,5,6,7,8,8a,9,10-dodecahydro-12-isopropyl-4bβ,8β-dimethyl-3H,3,10a-ethanophenanthrene-1,2-dicarboxylic acid phenylimide |
| 8α-amino- | 8α-amino- |
| 1,2,4,4a,4b,5,6,7,8,8a,9,10-dodecahydro-12-isopropyl-4bβ,8β-dimethyl-3H,3,10a-ethenophenanthrene-1,2-dicarboxylic acid anhydride | 1,2,4,4a,4b,5,6,7,8,8a,9,10-dodecahydro-12-isopropyl-4bβ,8β-dimethyl-3H,3,10a-ethanophenanthrene-1,2-dicarboxylic acid phenylimide |

EXAMPLE 27

A mixture of 250 parts of 1,2,4,4a,4b,5,6,7,8,8a,9,10-dodecahydro-12-isopropyl-4bβ,8β-dimethyl-3H,3,10a-ethero-8a-carboxyaldehyde-phenanthrene-1,2-trans-dicarboxylic acid and 25 parts of lactose is granulated with suitable water and to this is added 100 parts of maize starch. The mass is passed through a 16-mesh screen. The granules are dried at a temperature below 60°C. The dried granules are passed through a 16-mesh screen and mixed with 3.8 parts of magnesium stearate. They are then compressed into tablets suitable for oral administration according to the method for this invention.

Similarly, when an equivalent amount of any of the phenanthrene compounds in Examples 1–6 and 8–26 are employed as above, tablets suitable for oral administration are obtained.

What is claimed is:

1. A method of treating pain, fever or inflammation which comprises the administration to a patient of an effective amount of a compound of the formula:

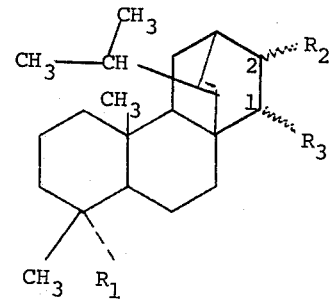

wherein $R_1$ is hydroxymethyl or formyl and $R_2$ and $R_3$ are each carboxy.

2. The method of claim 1 wherein an effective amount for treating pain, fever or inflammation of 1,2,-4,4a,4b,5,6,7,8,8,a,9,10-dodecahydro-12-isopropyl-4bβ,8β-dimethyl-3H,3,10a-etheno 8α-hydroxymethylenephenanthrene-1,2-trans-dicarboxylic acid is used.

3. A pharmaceutical composition comprising an effective amount for treating pain, fever or inflammation of the formula:

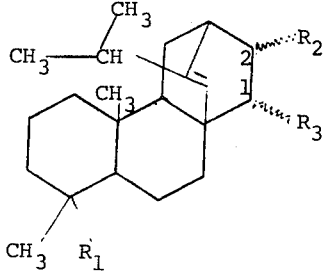

wherein $R_1$ is hydroxymethyl or formyl, and $R_2$ and $R_3$ are each carboxy in a pharmaceutical carrier.

* * * * *